United States Patent [19]

Wallman

[11] 3,990,305
[45] Nov. 9, 1976

[54] FUEL FLOW SYSTEM

[75] Inventor: Irwin Wallman, Briarcliff Manor, N.Y.

[73] Assignee: Consolidated Airborne Systems, Inc., N.Y.

[22] Filed: July 30, 1974

[21] Appl. No.: 493,076

[52] U.S. Cl. ............................................. 73/231 M
[51] Int. Cl.[2] .......................................... G01F 1/12
[58] Field of Search ............. 73/231 M, 231 R, 229, 73/233, 194 E, 194 M, 3; 324/179

[56] References Cited
UNITED STATES PATENTS

| | | | |
|---|---|---|---|
| 2,137,133 | 11/1938 | Dallmann............................... | 73/233 |
| 3,176,514 | 4/1965 | Foster.................................... | 73/229 |
| 3,425,274 | 2/1969 | Clement et al........................ | 73/194 M |
| 3,610,898 | 10/1971 | Yamamoto et al................... | 73/194 M |
| 3,688,573 | 9/1972 | Garrett ................................. | 73/233 |
| 3,729,995 | 5/1973 | Kovacs et al. ........................ | 73/233 |

*Primary Examiner*—James J. Gill
*Assistant Examiner*—Anthony V. Ciarlante
*Attorney, Agent, or Firm*—Bauer, Amer & King

[57] ABSTRACT

A fuel flow measuring system for measuring the flow rate of the fuel in an aircraft and including a turbine flow transmitter which is inserted in the fuel line of the aircraft and produces an output frequency representing a functional relationship to the volume of fuel passing through the flow transmitter, the functional relationship being referred to as the K factor. A control circuit receives the output frequency and converts it into a DC valve representing the flow rate of the fuel. The flow rate is then displayed on an indicator such as a flow meter. A resistor is located in the flow transmitter and is electrically coupled to the control circuit. The resistor is set at a value to compensate for variation in the functional relationship whereas a temperature sensor, also inserted into the transmitter and electrically coupled to the control circuit, serves as a temperature compensator.

13 Claims, 5 Drawing Figures

FUEL FLOW SYSTEM

This invention relates to a fuel flow system and more particularly to a fuel flow measuring system for aircraft use which includes a K factor compensator and may also include temperature sensors for temperature correction.

BACKGROUND OF THE INVENTION

The use of fuel flow systems for aircraft is well-known in the art. Such fuel flow systems typically include a turbine flow transmitter which is placed in the fuel line and provides an output frequency which is a function of the volume of fluid passing through the transmitter. This frequency is subsequently converted into a flow rate which is then displayed on an indicator. The flow rate can either be displayed in a volumetric flow rate, indicating gallons per unit time, or as a mass flow rate, indicating pounds per unit time. The relationship between the mass rate and volume rate being the density of the fuel represented in terms of pounds per gallon.

Known fuel flow systems generally have a very high error in their output because of numerous variations in the system. The system is usually calibrated in accordance with particular nominal values of density and temperature. However, the actual values differ greatly from the assumed nominal values. The difference occurs because the fuel used may be one which is different from that assumed as the nominal fuel. Also, there exists a great batch-to-batch variation in density within particular fuels. Furthermore, the variation in temperature from the nominal value assumed is quite drastic. Thus, the likelihood of the fuel temperature remaining at a constant value is remote. Fuel temperatures can readily range from 40° F. to 200° F. at the flow meter, and in certain cases the temperatures can even approach a low extreme of −40° F.

In order to reduce the errors in fuel flow sytems, the prior art has provided for compensated systems which can compensate for density and/or temperature. Most of the compensated fuel flow systems provide compensation within the electronic circuitry whereby the circuitry reacts to various temperature changes or variations in the density of the fuel. Such compensation means, when placed in the electronic circuitry, are not very accurate because they do not truly reflect the exact variations in temperature or density of the fuel itself.

In addition to the aforementioned sources of errors, an additional source of error can result from the particular flow transmitter being utilized. Typically, the flow transmitter produces a fixed number of pulses per volume of fluid passing therethrough. The functional relationship of pulses per gallon is generally referred to as the K factor. The value of the K factor is also utilized in the electronic circuitry to convert the pulses to a volumetric flow rate. If, however, the actual K factor of the flow transmitter does not equal the nominal K factor which is utilized in the electronic circuitry, volumetric flow rate determined will be in error. This error will be compounded during subsequent operations, such as integration, and will produce confusing and erroneous output values.

In prior art devices, in order to correct the K factor it was necessary to structurally modify the flow transmitter by adjusting its turbine blades to produce the desired K factor. Therefore, each time a flow transmitter was inserted into a particular flow system, it had to first be sent back to the manufacturer for proper adjustment and modification of its turbine blades in order to produce the desired K factor. These structural adjustments and modifications resulted in an expansive system and frequently caused time delays as well as causing restricted use of such flow systems and costly servicing thereof.

SUMMARY OF THE INVENTION

It is an object of the present invention to provide an improved fuel flow system which avoids the aforementioned problems of prior art devices.

Yet a further object of the present invention is to provide a fuel flow system which includes K factor compensation of the fuel flow transmitter.

Still a further object of the present invention is to provide a fuel flow system wherein errors in the K factor of the flow transmitter can be easily corrected within the electronic circuitry.

A further object of the present invention is to provide a fuel flow system which provides both K factor correction and temperature correction.

Still another object of the present invention is to provide a method of correcting for K factor variations in turbine flow transmitter which are utilized as part of a fuel flow measuring system.

Yet a further object of the present invention is to provide a fuel flow system with temperature correction, which is more accurate than prior art devices.

Still a further object of the present invention is to provide a fuel flow system having a turbine flow transmitter which can be easily modified to provide a specific desired K factor.

These and other objects, features and advantages of the invention will, in part, be pointed out with particularity and will, in part, become obvious from the following more detailed description of the invention, taken in conjunction with the accompanying drawings which form an integral part thereof.

Briefly, the invention comprises a fuel flow measuring system including, in combination, a turbine flow transmitter which is inserted in the fuel line of an aircraft and produces an output frequency representing a functional relationship to the volume of fuel passing therein. A control circuit receives the output frequency and converts it into a value representing the flow rate of the fuel. The flow rate is then displayed on an indicating device. A resistor, located within the flow transmitter, is electrically coupled to the control circuit and compensates for variations in the functional relationship between the output frequency of the flow transmitter and the volume of fuel. The functional relationship being generally referred to as the K factor and the resistor therefore serving as a K factor compensator.

Additionally, a temperature sensor can also be included within the turbine flow transmitter and also electrically coupled to the control circuit for correcting the variation in the fuel temperature.

In addition to the aforesaid system, a method is provided for compensating for K factor variations of the fuel flow transmitters of fuel flow measuring systems. Additionally, the method includes steps for compensating for temperature variations of the fuel passing through the turbine flow transmitter.

BRIEF DESCRIPTION OF THE DRAWINGS

In the drawings.

In the various figures of the drawings, like reference characters designate like parts.

DETAILED DESCRIPTION OF THE PREFERRED EMBODIMENTS

Figure 1:
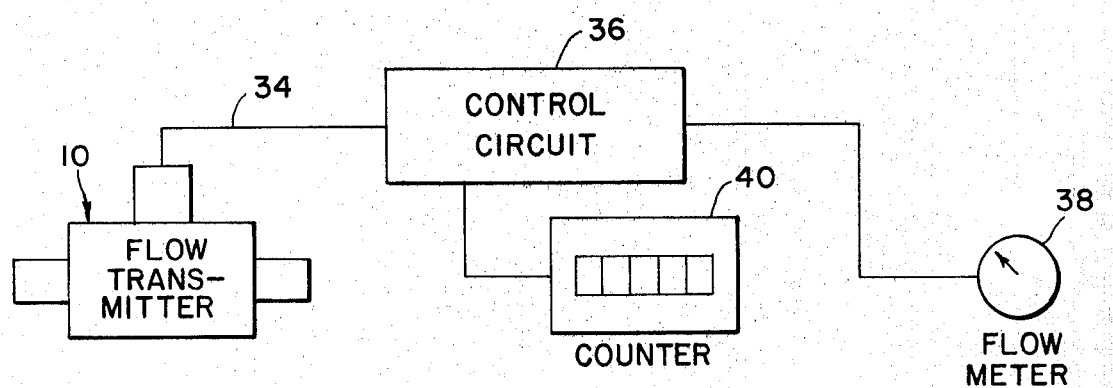
FIG. 1 is a general block diagram of a fuel flow system.
Figure 4:
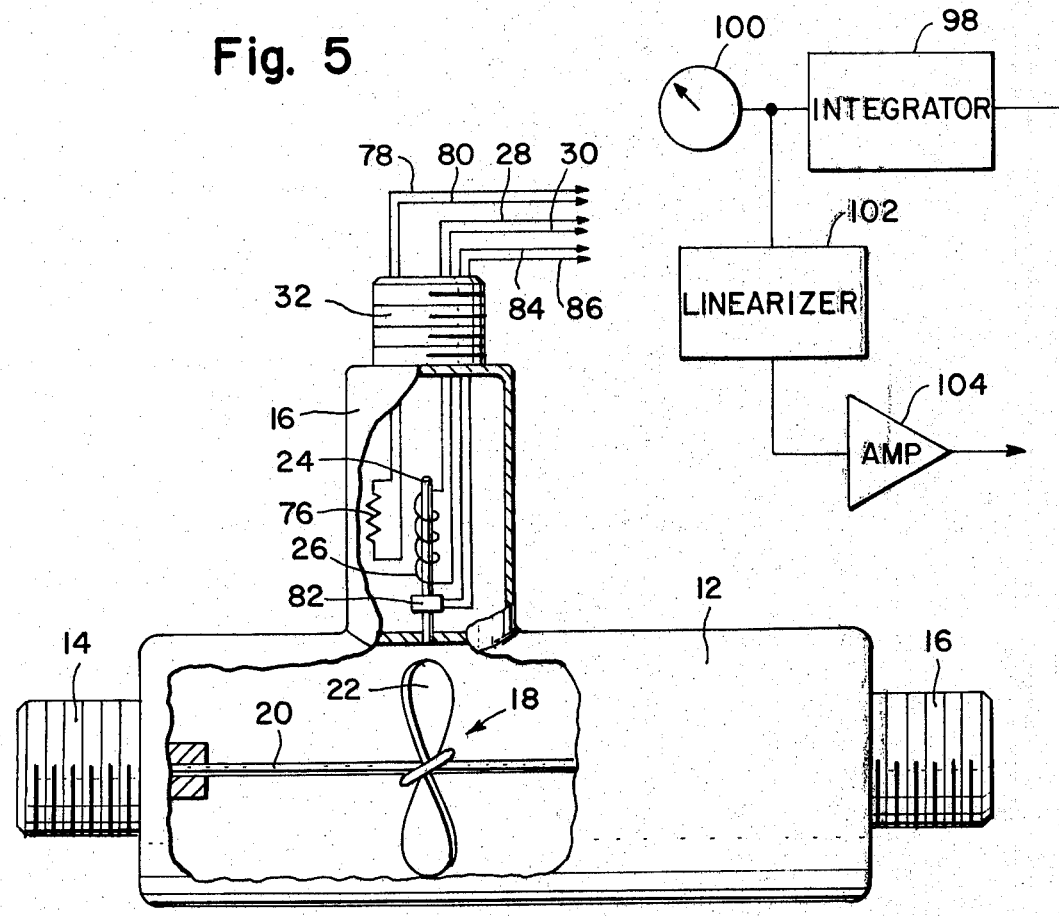
FIG. 4 is a partially broken away side view of a turbine flow transmitter in accordance with the present invention.

Referring now to FIG. 1, there is shown a general block diagram of the fuel flow system which can be utilized for measuring the flow rate of fuel in an aircraft. The fuel flow system includes a fuel turbine flow transmitter shown generally at 10, which measures the volume of a fluid as it flows through a passage in the transmitter. Referring to FIG. 4, there is shown in detail the construction of a flow transmitter which includes, typically, a stainless steel cylindrical body 12, having appropriate fittings 14, 16 at its ends, so that it can be included within a fuel line, and having an output section 16 extending from the main flow body 12. Internally, a rotor 18 is coupled to a shaft 20 which includes a turbine wheel 22. The flow of the fluid through a section 12 causes the turbine wheel 22 to rotate at a speed proportional to the fluid volume. Thus, the number of turbine revolutions is proportional to the volume of fluid passing through the transmitter. Consequently, a count of the revolutions per unit of time will measure flow rate, and a count of total revolutions will measure total flow volume.

The rotor may be carried in precision ball bearings supported in an aluminum alloy casing. The output section 16 has a signal pick-off circuit including a magnet 24 with a coil 26 wound around the magnet, and having wires 28, 30 extending from the output section 16 and available for electrical connection to the control circuit. A fitting 32 is provided to interconnect the transmitter to additional components of the fuel flow system.

As the rotor turns, its motion is detected by the magnetic pick-up coils. The rotor is typically positioned under the center line of the magnet 24 and therefore lies within its magnetic field. Since the rotor material is magnetic, the magnetic field contracts and expands with every sweep of each blade. These changes of magnetic flux density generate an AC voltage signal whose frequency is linear with repect to the flow. The frequency of the AC signal is equal to the number of blades multiplied by the number of revolutions per unit of time. The output frequency is related to the fuel flow rate by a K factor, defined as the number of output pulses per gallon. Thus $K = f/Q$, Wherein $f$ is the frequency in pulses per minute; $Q$ is the flow rate in gallons per minute, and $K$ is the factor in pulses per gallon.

Referring again to FIG. 1, the output from the pick-up coil of the flow transmitter is connected along line 34 to the control circuit 36. The control circuit 36 typically includes amplification devices which receive the output frequency of the flow transmitter. The amplifier output is shaped to provide a square wave which is then differentiated to produce a series of trigger pulses. These pulses are regulated to provide a number which will be proportional to the fuel rate. The pulses are then integrated to provide a DC signal which is applied to the fuel flow meter 38, which gives a flow rate indication. The indication can be a volumetric one, providing the number of gallons per unit time, or, alternatively, by introducing the density of the fuel as a factor in the control circuit 36, the flow meter 38 can indicate the mass fuel rate in pounds per unit time.

In addition to generating the DC output signal for driving the flow meter 38, a pulse output is provided which drives the counter 40 to provide a measure of the integrated fuel flow rate. The number of pulses counted on counter 40 can provide an indication of the amount of fuel which has been utilized or, the amount of fuel remaining. This indication can be either the volume of fuel, or alternately, the number of pounds of fuel.

Figure 2:
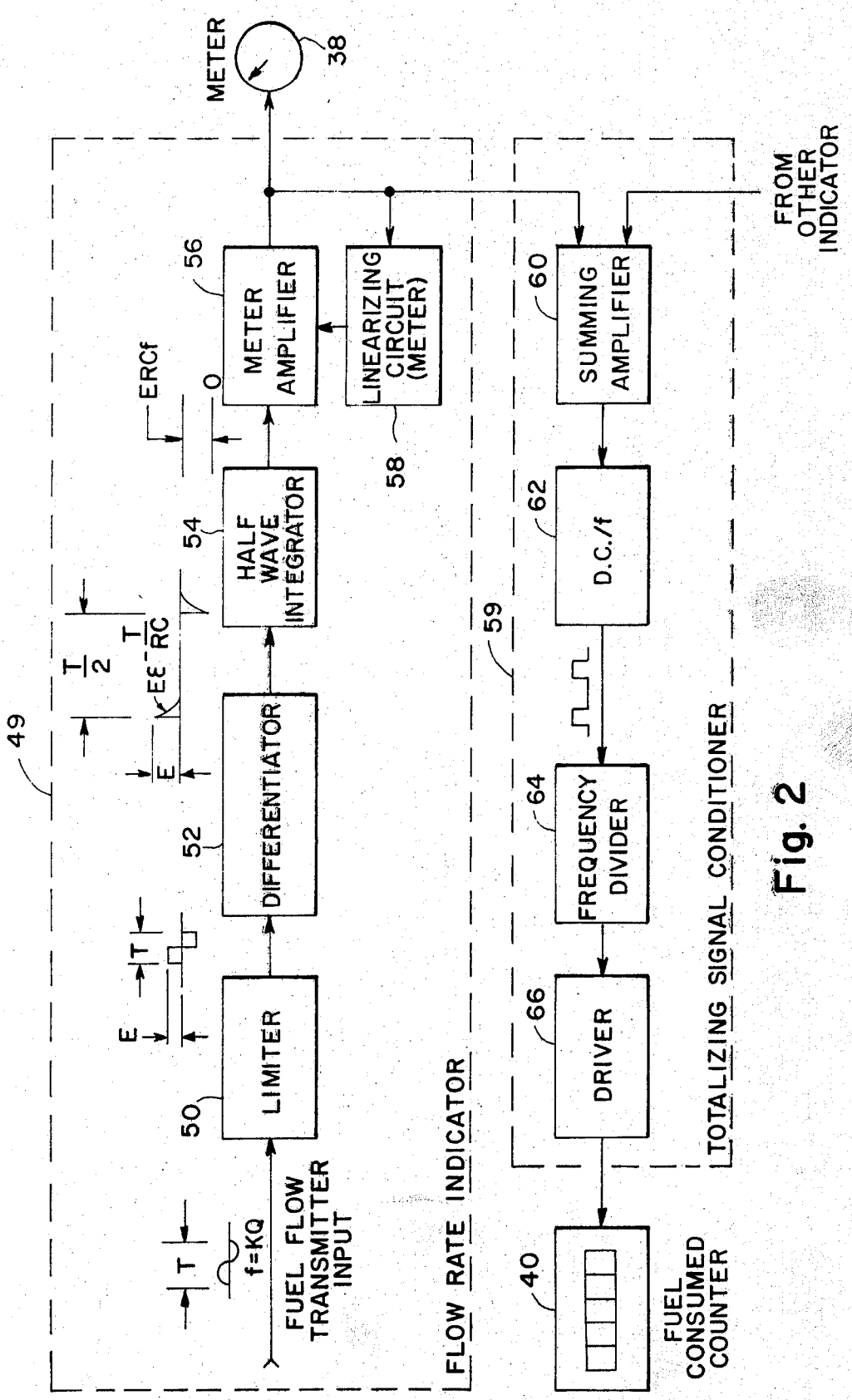
FIG. 2 is a more detailed block diagram of an embodiment of the electronic circuitry of the fuel flow system.

Referring now to FIG. 2, there is shown a detailed block diagram of one embodiment of the control circuit which receives the output frequency from the fuel flow transmitter and provides the proper output readings for the flow meter and the counter. The control circuit includes a flow rate indicator section, shown within the dotted lines 49, and a totalizing signal conditioner section, indicated within the dotted line 59. The flow meter 38 is coupled as the output of the flow rate indicator circuit 49 and the counter is coupled as the output of the totalizing signal conditioner circuit 59.

The output of the flow transmitter is an AC voltage of essentially sinusoidal waveform as is shown. The frequency $f$ is equal to a proportional relationship times the volumetric flow $Q$. The proportionality is represented by the $K$ factor. In order to obtain a DC potential proportional to the flow rate, the signal is first amplified and precision limited by means of limiter 50 to provide a square wave having an amplitude E and a duration T, wherein the period T is the same as that of the AC frequency signal provided by the flow transmitter. A characteristic of the limiter is that it provides a sharp leading edge. The square wave from the limiter is then applied to a differentiating network 52, which can typically be made up of a stable capacitor and resistor. The time constant of the differentiating network 52 is made sufficiently smaller than the shortest half period to be expected so that the decaying exponential waveform will have essentially gone to zero before the next pulse is generated. The differentiated pulses will be represented by the formula $Ee^{-T/RC}$, and one such pulse will be provided in each time period T.

The differentiated pulses are then passed through a half wave integrator to obtain the average DC value of the pulses. The DC values can be expressed by the formula $E_{DC} = ERC/T(1 - E^{-T/RC}$ wherein E is the limiter value; R and C are the resistance and capacitance, respectively of the differentiating circuit, f is the frequency of the AC signal from the flow transmitter and T is the time period. ($T = 1/f$)

A ratio of T/RC greater than 7 provides a value of $E^{-T/RC}$ of less than 0.001. As a result, the above equation can be written as $E_{DC} = ERCf$.

Since F is the frequency of the input waveform, it is seen that in order to obtain an average DC potential proportionate to frequency, it is necessary to maintain the peak amplitude of the exponential stable as well as the RC product. The peak amplitude is determined by precision limiting the amplitude of the driving square wave. The RC time constant may be made stable by selection of the capacitor and resistor in the differentiating circuit, to have a predictable temperature co-efficient within acceptable limits. The resulting DC signal which is proportional to the input frequency, is applied to a meter amplifier 56 and meter linearizing circuit 58. The amplified DC output signal is read out on flow meter 38, which provides the total flow rate. The DC signal is also sent to a summing amplifier 60, which also receives the DC values from other flow rate indicator circuits being utilized within the same or other fuel lines. The resulting summed DC signal from the amplifier 60 is therefore proportional to the total flow rate. The amplified output is then applied to a DC to frequency converter 62 which provides a pulse train output. The pulse train repetition rate is therefore proportional to the total flow rate. After appropriate scaling in the frequency dividing circuit 64, the pulses are sent to the counter 40 through a driving circuit 66. Each count represents a specific unit of fuel. Thus, the counter 40 can indicate the total number of gallons, or pounds of fuel, which have been consumed. It is understood that the counter could also be set to indicate the amount of fuel remaining.

The peak amplitude of the DC wave at the output of the flow rate indicator circuit 49 was shown to have a proportional relationship to the frequency. This proportionality included the peak amplitude E as well as the RC values of the differentiating circuit. It is therefore understood that the proportionality relationship between the DC output value and the frequency can be appropriately controlled in accordance with various factors within the fuel system. Thus, the value E can be controlled to compensate for temperature variation and can also be controlled to compensate for K factor variations. This will be further explained with regard to a more detailed circuit shown in FIG. 3.

Figure 3:
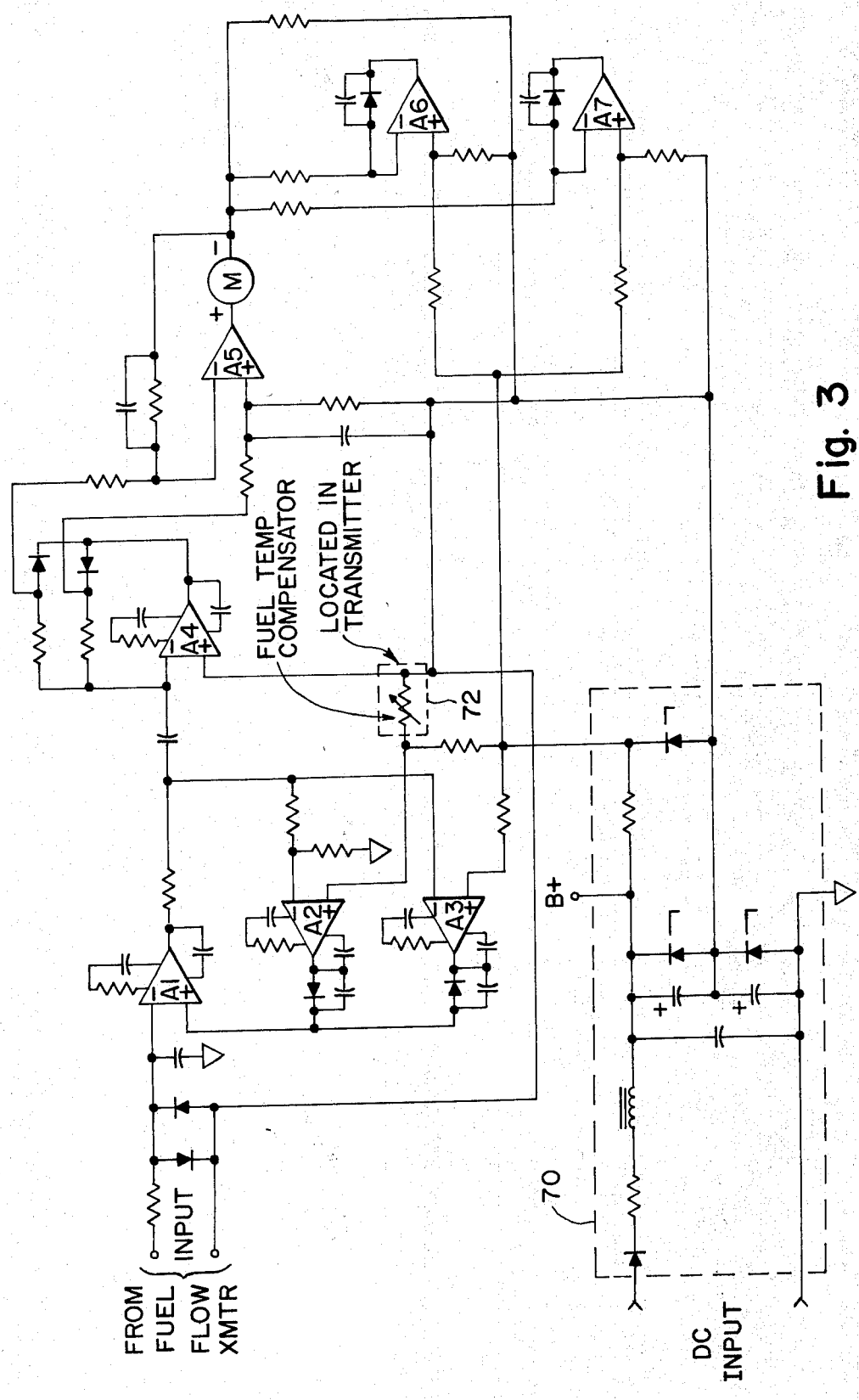
FIG. 3 is a detail circuit diagram of one embodiment of the flow rate indicator circuitry.

Referring now to FIG. 3, there is shown a schematic diagram of the flow rate indicator circuit 49 of FIG. 2. The input signal from the flow transmitter is amplified and limited to provide a square wave, by the high gain amplifier A1 to produce nearly vertical zero crossing. The height of this clipped square wave is very accurately controlled by the limiter amplifiers A2 and A3. Amplifier A4, and its associated circuitry serves the dual purpose of both differentiating and rectifying the clipped square wave to produce a series of bi-directional pulse pairs, each pulse having a stable volt-second content. These pulses are then integrated and amplified by current amplifier A5. The DC output current of A5 is used to drive the meter movement M, which represents the flow meter. In order to compensate for meter non-linearalities, two selectable break points and slope changes are provided by the clamping action of amplifier A6 and A7. A power supply 70 is included within the dotted section, which provides the necessary voltages for the circuit and is supplied from a DC voltage input.

Since the amplitude of the DC voltage is controlled by the amplifiers A2 and A3, the inputs to these amplifiers can be appropriately set to control the amplitude in accordance with a desired amount. Control of the inputs to the limiting amplifiers A2 and A3 can be achieved by adding appropriate resistors to their input lines. If these resistors are set in accordance with values to compensate for variations of the fuel system, the control circuit can automatically compensate for such variations. Thus, by way of example, a resistor 72 is shown included within the input line of the limiting amplifier A2. This resistor is shown as a fuel temperature compensator and would typically be a temperature sensitive resistor located within the fuel flow transmitter. As is well known, the specific gravity and accordingly, the density of fuels vary as a function of temperature. By placing the resistance temperature device 72 in the flow transmitter, the value of the resistance will vary in accordance with the variation in temperature. This would then appropriately vary the input to the limiting amplifier A2, which, in turn would vary the peak amplitude of the DC output voltage produced. Accordingly, the proportionality constant between the output DC voltage produced and the frequency will be controlled to automatically compensate for temperature variations and thereby reduce errors resulting from such temperature variations.

In addition to errors resulting from temperature variations, errors can also result from changes in the K factor. As has heretofore been explained, the control circuit takes into account the K factor when converting the output frequency from the flow transmitter to thereby produce the flow rate. However, the K factor which is presumed by the control circuit is a nominal K factor. Unfortunately, the actual K factor of the flow transmitter may differ from the nominal K factor being used. This is usually the case since each flow transistor has its own K factor which differs from every other flow transmitter. Thus, if a particular flow transmitter were to be removed from a fuel flow system and replaced by a different flow transmitter, the new flow transmitter would undoubtedly have an actual K factor which differs from the nominal K factor presumed by the electronic control circuit and the indicated flow rate would include an error. In order to remove this error, it would be necessary to send the new flow transmitter back to the manufacturer and have it calibrated to produce the particular K factor desired, which would correspond to the nominal K factor presumed by the electronic control circuit. The manufacturer would adjust the K factor by typically modifying the turbine blades until the desired K factor is produced. However, this process is time-consuming, costly and severely restricts the replaceability of flow transmitters in fuel flow systems. This difficulty can cause extremely hazardous conditions when aircrafts must be regularly used and may result in the grounding of an aircraft until the flow transmitter can be properly calibrated and adjusted by the manufacturer to provide the required K factor.

In order to alleviate this problem and provide a correct K factor in the flow transmitter, the present invention provides a K factor compensator which can be easily utilized to compensate for variations of the K factors of flow transmitters. This compensator will then permit easy replacement of flow transmitters by merely electrically compensating for variations in the K factor.

The electronic circuit converts the output frequency from the flow transmitter in accordance with the following formula:

$$\text{Meter reading} \frac{(\text{Gallons})}{(\text{Min.})} = \frac{\text{Pulses}}{\text{Min.}} \times \frac{1}{K \text{ factor (nominal)}}$$

If, however, the actual K factor differs from the nominal K factor, the meter reading should be modified in accordance with the following formula:

$$\text{Meter reading} \frac{\text{(Gallons)}}{\text{(Min.)}} = \frac{\text{Pulses}}{\text{Min.}} \times \frac{1}{K \text{ factor (nominal)}} \times \frac{K \text{ factor (nominal)}}{K \text{ factor (actual)}}$$

In order to achieve the compensation, it has been recognized that a resistance ratio can be set up which is in proportion to the K factor ratio.

$$\frac{R \text{ actual}}{R \text{ factor}} = \frac{K \text{ nominal}}{K \text{ actual}}$$

R factor represents the nominal-setting of the resistor.

By setting the R factor at a predetermined value, such as, for example, 1500 ohms, the resistance, R actual, will be equalled to a proportional constant times the K factor compensating ratio.

A resistor is therefore inserted within the flow transmitter itself such that it will not be affected by the various conditions existent within the flow transmitter. The resistor is interconnected to the electronic control circuit, at a location to provide electrical K factor compensation. Such a location can be, for example, by interconnecting the resistor into the input of the limiting amplifier. The value of the resistance can then be set to limit the amplitude of the output DC signal, thereby compensating for variations of the K factor. Thus, by way of example, if the actual K facotor is exactly equal to the nominal K factor, the resistance R actual which is inserted into the flow transmitter will be 1500 ohms. If, on the other hand, the K factor is different from the nominal K factor, then the resistance, R actual, inserted in the flow transmitter will be slightly higher or slightly lower than the 1500 ohms, depending on whether the K factor is higher or lower. Accordingly, the amplitude of the DC output signal will be higher or lower to thereby compensate for the changes in the K factor.

In addition to utilizing the K factor compensator, the temperature sensor can also be included within the flow transmitter to provide fuel temperature compensation. Thus, referring now to FIG. 4, the resistor 76 is shown inserted within the flow transmitter and having external wires 78, 80, extending therefrom. This resistor represents the R factor resistor which provides the K factor compensation. The wires 78, 80 can be interconnected to the control circuit, typically, to the input of the limiting amplifier, to thereby control the peak amplitude of the DC signal. Additionally, the resistance temperature device 82 is shown placed within the flow transmitter to respond to variations in temperatures. The output from the temperature sensor 82 is taken at lines 84, 86, which would also be interconnected to the control circuit, typically to the input of limiting amplifier. Although the K factor compensator and the temperature sensor are both shown within the output housing 16, which houses the magnetic pick-up coil, it is understood that both of these resistors could be placed within the housing body 12 wherein the fuel actually flows. This might further reduce errors since the temperature detected by the resistors would be the actual temperature of the fuel and losses resulting in temperature drops within the flow transmitter housing could be eliminated.

Figure 5:
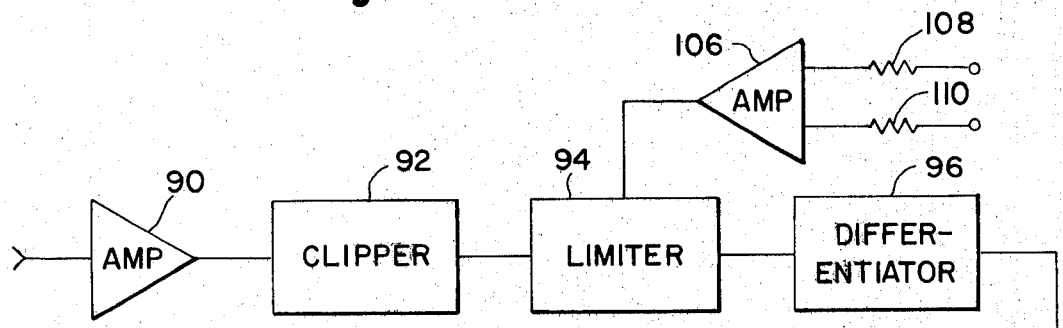
FIG. 5 is a block diagram of another embodiment of the electronic circuitry of the fuel flow system in accordance with the present invention.

Referring now to FIG. 5, there is shown a block diagram of another embodiment of the control circuit including an amplifier 90, receiving the signal from the flow transmitter and passing it through a clipper 92 to form a square wave whose amplitude is limited in limiter 94. Differentiating circuit 96 provides the pulses which are subsequently integrated in integrator 98, thereby providing the DC output signal proportional to the frequency. The DC signal is then read on flow meter 100, which provides an output signal indicative of the flow rate. The DC signal is also sent through a linearizer 102 and a buffer amplifier 104 to be further processed in a totalizing circuit to thereby provide a fuel consumed amount.

Connected to the limiter is a correcting circuit including amplifier 106 having 2 differential inputs including resistors 108 and 110. Resistor 108 represents the K factor compensating resistor, and resistor 110 represents the temperature sensing resistor, both of which are located in the flow transmitter. These resistors would set the value of the correcting amplifier 106 which, in turn, controls the amplitude of the limiting circuit 94.

Thus, in order to correct for the K factor of various flow transmitters, it is no longer necessary to submit the flow transmitter to the manufacturer to have the turbine blades mechanically adjusted. Instead, it is now possible to electronically compensate for variations in the K factor by placing an appropriate resistor within the flow transmitter and interconnecting the resistor within the control circuit, such that the variations in K factor are electronically compensated. This can typically be achieved by limiting the peak value of the DC signal. Such K factor compensation can be utilized in conjunction with temperature correction by using an additional resistance temperature device within the flow transmitter which also interconnects to the control circuit. Using both resistors in connection and a compensating amplifier, the electronic circuit can provide more accurate results by removing inherent errors in the system resulting from both temperature variations and K factor variations.

There has been disclosed heretofore the best embodiments of the invention presently contemplated. However, it is to be understood that various changes and modifications may be made thereto without departing from the spirit of the invention.

I claim:
1. A fuel flow measuring system comprising, in combination:
   a. Turbine flow transmitter means adapted to be inserted in a fuel line and producing an output frequency representing an actual functional relationship to the volume of fuel passing therethrough, said actual functional relationship being dependent upon the physical characteristic of the flow transmitter means;
   b. control circuit means receiving said output frequency and converting it into a value representing the flow rate of the fuel by utilizing a nominal K factor relationship;
   c. display means for displaying said flow rate; and
   d. resistor means located in said flow transmitter means and electrically coupled to said control circuit means for compensating said actual functional relationship in accordance with said nominal K factor relationship, said flow transmitter together with said resistor being physically separable as a complete unit from said control circuit whereby different flow transmitters may be interchangeable by selection of the proper valve for said resistor means.

2. The system as in claim 1, and wherein said control circuit means includes indicator circuit means having frequency to DC conversion circuitry, and totalizing signal circuit means having DC to frequency conversion circuitry, said totalizing signal circuit means receiving the output from said indicator circuit means.

3. The system as in claim 2, and further comprising digital counter means coupled to the output of said totalizing signal circuit means, and wherein said display means is coupled to the output of said circuit means.

4. The system as in claim 2, and wherein said indicator circuit means includes limiting means for shaping the output frequency signal from said flow transmitter means, differentiating means for differentiating such shaped signal, and integrating circuit means for forming the average DC value from said differentiating means.

5. The system of claim 4 and further comprising amplitude limiting means for adjusting the magnitude of the shaped signal, said resistor means being coupled to the input of said amplitude limiting means.

6. The system of claim 1 and further comprising temperature sensing means locating in said flow transmitter means and electrically coupled to said control circuit means for compensating for variations in the temperature of the fuel.

7. The system as in claim 6, and wherein said control circuit means includes correcting circuit means having a differential amplifier with two inputs, said temperature sensing means being coupled to one of said inputs and said resistor means being coupled to the other of said inputs.

8. The system as in claim 1, wherein said flow transmitter means includes a main housing having an internal cylindrical wall, a shaft supported within said housing, a rotor having a plurality of blades supported on said shaft, an output housing means mounted onto said main housing, said output housing including a magnet, a pick-off coil wound around said magnet, and output lead wires connected to said pickup coil and extending externally from said output housing.

9. The system as in claim 8 and further comprising temperature sensing means located in said output housing means.

10. The combination as in claim 1 and wherein said functional relationship is the K factor represented by the formula $K = f/Q$, wherein $f$ is the frequency in pulses per minute, $Q$ is the flow rate in gallons per minute, and $K$ is measured in pulses per gallon.

11. In a fuel flow measuring system comprising a turbine flow transmitter, a control circuit and a display device, the method of compensating for variations in the K factor of the flow transmitter, said K factor being dependent upon the physical characteristics of the flow transmitter, comprising the steps of:
   a. arranging the control circuit to produce a DC output signal in response to the frequency output of the flow transmitter utilizing a nominal K factor;
   b. adjusting said control circuit by varying a resistor therein to represent the actual K factor of the flow transmitter being utilized; and
   c. locating said resistor in the flow transmitter housing while retaining a separable electrical connection as a complete unit from said housing to the control circuit whereby different transmitters may be interchangeable by selection of the proper value for said resistor.

12. The method of claim 11 and further comprising the step of inserting a temperature sensing device into said flow meter housing and electrically connecting said temperature sensing device to the control circuit.

13. The method of claim 12 and wherein said temperature sensor and said K factor resistor are both interconnected to an amplitude limiting circuit within said control circuit.

* * * * *